United States Patent
Pflaesterer

(10) Patent No.: US 7,226,684 B2
(45) Date of Patent: Jun. 5, 2007

(54) SEALING ARRANGEMENT FOR FUEL CELLS

(75) Inventor: Jens Pflaesterer, Moerlenbach/Weiher (DE)

(73) Assignee: Carl Freudenberg KG (DE)

( * ) Notice: Subject to any disclaimer, the term of this patent is extended or adjusted under 35 U.S.C. 154(b) by 644 days.

(21) Appl. No.: 10/315,401

(22) Filed: Dec. 9, 2002

(65) Prior Publication Data

US 2003/0235744 A1     Dec. 25, 2003

(30) Foreign Application Priority Data

Dec. 12, 2001    (DE) .............................. 101 60 905

(51) Int. Cl.
*H01M 2/00*      (2006.01)
(52) U.S. Cl. .............................. 429/34; 429/36; 429/37
(58) Field of Classification Search .................. 429/34, 429/35, 36, 30, 33; 428/346; 49/484.1, 49/489.1, 499.1, 95
See application file for complete search history.

(56) References Cited

U.S. PATENT DOCUMENTS

| 3,846,176 A | 11/1974 | Kuhl .......................... 136/86 |
| 4,774,154 A | 9/1988 | Singelyn et al. .............. 429/36 |
| 6,080,503 A | 6/2000 | Schmid et al. ................ 429/35 |
| 2001/0001052 A1 | 5/2001 | Bonk et al. .................... 429/32 |
| 2002/0055027 A1 * | 5/2002 | Inoue et al. ................... 429/30 |
| 2002/0068212 A1 | 6/2002 | Osenar et al. ................. 429/36 |

FOREIGN PATENT DOCUMENTS

| DE | 19713250 | 10/1998 |
| EP | 0951086 | 10/1999 |
| FR | 2799257 | 4/2001 |
| GB | 2368968 | 5/2002 |

* cited by examiner

*Primary Examiner*—Raymond Alejandro
(74) *Attorney, Agent, or Firm*—Harness, Dickey & Pierce, P.L.C.

(57) ABSTRACT

A sealing arrangement for fuel cells, including a at least one composite (40) formed of two cell separator plates (1, 4; BPP) with a deformable membrane electrode assembly (18; MEA) placed therebetween, the deformable membrane electrode assembly being composed of two porous, gas-permeable plates or layers (2, 3; GDL) and an ion-exchange membrane (5; PEM) placed therebetween, the lateral surfaces (7, 8, 9) of the membrane electrode assembly being set back with respect to the lateral surfaces (6, 10) of the cell separator plates to leave a sealing gap (19), an elastic sealing element (17) which encloses the composite in the manner of a peripheral sealing band (28), the sealing element (17) having a peripheral sealing strip (20) which extends into the sealing gap (19) to seal the sealing gap (19) in a gas-tight manner by compression between the cell separator plates (1, 4; BPP).

5 Claims, 2 Drawing Sheets

SEALING ARRANGEMENT FOR FUEL CELLS

Priority to German Patent Application No. 101 60 905.1-45, filed Dec. 12, 2002 and hereby incorporated by reference herein, is claimed.

BACKGROUND INFORMATION

The present invention relates to a sealing arrangement for fuel cells including at least one composite formed of two cell separator plates with a deformable membrane electrode assembly placed therebetween. The deformable membrane electrode assembly is composed of two porous, gas-permeable plates or layers and an ion-exchange membrane placed therebetween, the lateral surfaces of the membrane electrode assembly being set back with respect to the lateral surfaces of the cell separator plates to leave a sealing gap. The present invention relates as well to an elastic sealing element enclosing the composite in the manner of a peripheral sealing strip.

Fuel cells are electrochemical energy converters and are well-known. They produce electric energy by oxidizing a fuel. In the simplest case, they are composed of planar, electrically conductive electrodes which are gas-permeable and separated from each other by an ion-conducting membrane. The reaction media are supplied via distribution plates having integrated gas- or liquid-conveying channels. These distribution systems have to be sealed both from each other and from the outside. To produce an electric voltage or an electric current of a technically usable magnitude, usually a plurality of large-surface, thin plates or layers are arranged above each other in the form of a stack and the individual cells are interconnected in series or parallel. The electric energy produced by the converter is tapped at electrically conductive electrodes of the stack.

In the simplest case, such an electrochemical fuel cell is composed of two electrodes, designed and referred to in literature as a planar "gas diffusion layer", hereinafter abbreviated as GDL, between which is located an ion-conducting layer, each electrode having an adjacent gas space in which in each case one reaction medium is supplied via distribution channels. Seals between the individual cell elements prevent the reaction medium from escaping.

In certain fuel cells, the ion-conducting membrane is a polymer. The present invention relates to the sealing of such a polymer electrolyte membrane fuel cell, hereinafter referred to in short as "PEM cells". This type of chemical fuel cells is increasingly gaining importance as a future energy source for the propulsion of motor vehicles. The requirements for this application include as favorable a mass/power ratio as possible and a sealing of the distribution systems which remains reliable over several years.

In polymer electrolyte membrane fuel cells, the two porous, gas-permeable electrodes and the very thin proton-conducting polymer electrolyte membrane placed therebetween are usually combined into a so-called "membrane electrode assembly", hereinafter abbreviated as MEA. When arranged in the stack, these assemblies are separated by so-called "cell separator plates". The latter are provided with the above-mentioned distribution structures for the reaction gases in the surface. The stack is terminated with end plates on each of the end faces and held together by tie bolts, pressing the layers together. Often, nonmetals, such as graphite, but also metals, such as high-grade steel or titanium, are used for the electron-conducting cell separator plates. A suitable electrode material for the anode or cathode is plastically deformable and electrically conductive material such as graphite films or non-woven fabric materials. The electrode surface contacting the polymer electrolyte membrane is coated with a catalyst, for example, a platinum material. Cell separator plates within the stack are in electrical contact with the anode of a cell of the stack via one of their surfaces while their opposite surface is in contact with the cathode of another, adjacent cell. According to this function, these cell separator plates within the stack are also referred to as so-called "bipolar plates", hereinafter referred to in short as "BPP". Apart from their function of conducting the electric current in the stack, they also have the function of separating the reaction gases.

For a PEM fuel cell, usually, hydrogen is used as the reaction gas and oxygen or air are typically used as the oxidizing agent. Hydrogen is supplied to the anode chamber formed by the distribution structure on the anode while the oxygen or air is supplied to the cathode chamber. Via the gas-permeable electrodes, the reactants reach the proton-conductive ion-exchange membrane through the catalyst layer. Cations forming at the catalyst layer of the anode migrate through the ion-exchange membrane and react with the oxidizing agent supplied at the cathode side to produce, on one hand, water as a reaction product and, one the other hand, electric and thermal energy. The electric energy can be supplied to a load via a an external electric circuit while the thermal energy in the stack has to be dissipated through suitable cooling channels between the cell separator plates.

High demands are placed on the seals between the individual cell elements. PEM fuel cells which are intended to supply energy to a motor vehicle are exposed to rough environmental conditions. The seal has to withstand heavy vibrations, humidity fluctuations and variations in temperature. Leaks can occur due to different material expansion.

To seal the gas spaces and the fluid collection channels, German Patent Application No. 197 13 250 proposes a gas- and liquid-tight adhesive composite of the membrane electrode assembly with the adjacent cell separator plates in the manner of a peripheral seal. The adhesive composite material is achieved by an adhesive agent which interconnects the cell elements in a marginal region, forming a gas-tight seal. The lateral surfaces of the membrane electrode assembly are set back with respect to the lateral surfaces of the cell separator plates, thus forming a sealing gap which is filled by the adhesive composite material and protects the polymer electrolyte membrane from desiccation. Several such modules can be connected by coating the end faces of the stack with adhesive composite material. The handling of the adhesive agent, which needs to be accurately applied in the marginal region, is a disadvantage during production. Another disadvantage is the undetachable connection in a stack of fuel cells as a result of which the whole stack must be discarded when one cell is defective.

SUMMARY OF THE INVENTION

It is an object of the present invention is to provide a sealing arrangement which allows a composite of plates of a fuel cell or of a plurality of fuel cells to be reliably sealed in a gas-tight manner and permits easy replacement of a defective composite in a stack of fuel cells.

A further alternate or additional object of the present invention is to provide a manufacturing method which allows mass production at low production cost. Another alternate or additional aim of the present invention is to devise an electrochemical energy converter which is suitable for mobile application and allows easy maintenance and repair.

The present invention provides an elastic sealing element which encloses the composite in the manner of a peripheral sealing band and features a sealing strip which is compressed in a sealing gap between cell separator plates, thus sealing the sealing gap in a gas-tight manner. In this context, the present invention is based on an arrangement of the plates or layers in which the peripheral lateral surfaces of the membrane electrode assembly are set back with respect to the peripheral lateral surfaces of the cell separator plates. In this manner, a sealing gap is left at the peripheral lateral surface of the composite. A projecting rib of the sealing element, the sealing strip, extends into this sealing gap. Due to the deformability of the electrodes of the membrane electrode assembly, the sealing gap becomes narrower as soon as a pressing force is exerted on the end faces of the end plates. Exposed marginal surfaces of the cell separator plates in the sealing gap become pressing surfaces, resulting in a compression of the elastic sealing strip located therebetween. The gas-tight elastic sealing material compressed between the pressing surfaces of the cell separator plates forms an effective barrier, preventing the reaction gases from escaping in the compression gap. The compression in the sealing gap also causes the elastic sealing material to spread laterally, thus increasing the pressure on the peripheral lateral surfaces of the membrane electrode assembly also laterally. In this manner, a reliable sealing effect is achieved even when the individual plates or layers of the composite deform or expand due to mechanical stress during assembly or because of vibrations or thermal expansion during operation. Especially the ion-exchange membrane is sensitive to expansion. Since, according to the inventive embodiment, the elastic sealing material contacts only the peripheral lateral surface of the membrane but not the upper or lower surface thereof, damage to the PEM due to deformation or expansion of the plates is nearly ruled out. The enclosing sealing band also prevents the polymer electrolyte membrane from desiccation. Due to the mechanical compression of the peripheral sealing strip, the sealing gap is gas-tight even if the elastic sealing material does not or only very poorly adhere to the lateral surfaces, which is the case, for example, if the cell separator plates are composed of graphite. Each cell in a stack can be provided with pressing surfaces of different size, depending on its position in the middle or end regions of the stack. In this manner, the distribution of the sealing pressing force, which is inhomogeneous within the stack, is equalized along the length of the stack.

In the case of a plate composite which is located in the end region of the stack and to which increased pressure is applied, unacceptably high compression of the sealing material in the sealing gap can be prevented by appropriately sized pressing surfaces. Through proper sizing of the respective pressing surfaces, it can be achieved that the sealing function is approximately equal in the middle and end regions of the stack although the pressing forces have different magnitudes. Furthermore, the sealing element designed according to the present invention makes it possible to combine several cells into composites. Because of this, defective cells can easily be changed in a modular fashion. The production cost of the seal is comparatively low. Due to the sealing gap extending into the composite at the peripheral lateral surface, the surface dimensions of the polymer electrolyte membrane and thus the material cost of the fuel cell are reduced. The sealing arrangement according to the present invention increases the total weight of the electrochemical energy converter only very slightly, which is advantageous for a mobile application. No depressions are required in the cell separator plates for the sealing element, which is convenient for production.

With regard to a simple and inexpensive manufacture, it is of decisive importance that the sealing band and the sealing strip be integrally formed as an injection-molded part of a uniform material made of a polymer. Through injection molding, the elastic sealing material penetrates into the smallest areas of the sealing gap, filling it completely.

With regard to production costs, it is an advantage that the sealing arrangement is manufactured and installed in one operation. Due to the sealing material which adheres firmly to the lateral surfaces and to the pressing surfaces, the individual layers are not only sealed but also held together.

Advantageously, the sealing element is designed such that extends over an outer edge of an end face of an outer first cell separator plate and over an outer edge of an end face of an outer second cell separator plate in order to hold together the composite or composites in a clamp-like manner. In this manner, modules are formed. This is particularly advantageous with regard to maintenance and repair in a fuel cell stack, because this allows defective modules to be changed in a simple manner.

In this context, it is advantageous for the sealing element to be designed to have a peripheral sealing profile in the region of a first clamp edge and to be a flat surface in the region of a second clamp edge. In this manner, a coolant which circulates between modules can easily be sealed by the sealing profile.

It is advantageous if the polymer is an elastomer. Elastomers are widespread in general sealing technology. The materials EPDM (ethylene propylene diene rubber), FPM (fluorocarbon polymer), TPE (thermoplastic elastomer) are particularly easy to process using injection molding. It is also conceivable to use silicone or other plastics such as epoxy resin.

A particularly reliable sealing effect can be achieved if the porous, gas-permeable plates of the GDL are each impregnated and/or coated with a second polymer on one or two sides in an end region at the edge of the surfaces, and the lateral surfaces of the ion-exchange membrane are set back with respect to the lateral surfaces of the porous plates, thus leaving a second sealing gap into which extends a second sealing strip to seal the second sealing gap in a gas-tight manner by compression between the cell separator plates. The compression of the first sealing gap is located before the compression of the second sealing gap. By this measure, the reaction gases are reliably sealed off between the GDL-layers of an MEA. Overall therefore, the sealing effect is improved. Here too, the polymer electrolyte membrane makes contact with the elastic sealing material only at its peripheral lateral surface. In comparison with the known prior art, the sealing surface of the polymer electrolyte membrane is thus further reduced and material cost is reduced.

For a particularly good sealing effect, it is also advantageous if the porous plates are completely soaked by a second polymer in an end region. In this manner, the sealing of the reaction gases does not exclusively fall to the sealing gap but is, at least partially, already accomplished in the porous plate. Suitable materials for the second polymer include those made of silicone or FPM (fluorocarbon polymer), epoxy resin or PTFE (polytetrafluoroethylene).

It is particularly advantageous for the first polymer and the second polymer to be the same material. In this manner, a chemical combination occurs between the material of the sealing element and the second polymer with which the porous plates are soaked. This results in a very reliable and long-lasting sealing effect which withstands even heavy vibrations during mobile operation.

It is convenient for the sealing gap to have a width of about 50 µm to 4 mm and for the elastic sealing element to be formed of a material having a Shore A hardness of 20 to 100.

The sealing arrangement according to the present invention is particularly suitable for an electrochemical energy converter which contains one fuel cell or a plurality of fuel cells arranged as a stack. In the rare case that the energy converter is constituted by one fuel cell, the present invention allows the sealing arrangement not only to seal the plates of the fuel cell in a gas-tight manner but also to hold them together. In the by far more important case that the energy converter includes a plurality of fuel cells which are arranged above each other and interconnected in series or parallel, the present invention makes it possible to combine several cells into modules, which facilitates maintenance and repair.

For mass production at low production cost, the present invention proposes a method in which:

a) the marginal regions of two porous plates are coated or partially impregnated or soaked with a first polymeric sealing material, b) an ion-exchange membrane is placed between the two porous plates to form a membrane electrode assembly, c) a unit is formed in that the membrane electrode assembly formed in b) is placed between two cell separator plates, d) this unit or a plurality of these units is/are inserted in the form of a stack into the cavity of an injection mold, e) a contact pressure is applied to the end faces of the inserted unit or units in the cavity, the pressure being so high that the polymeric sealing material withstands an injection pressure with a second polymeric material, f) a composite or composites is/are formed in that a melt of a second polymeric sealing material is injected into the cavity of the injection mold, g) the melt is solidified, h) the composite or the composites of fuel cells formed in f) is/are removed from the mold, i) the sealing arrangement is further heated or annealed, if required.

The injection molding of the polymeric sealing material is of decisive importance for an economical production of fuel cells. The vulcanization mold can be removed conventionally and therefore has a simple design.

The sealing arrangement according to the present invention is manufactured and installed in one production phase. A module formed of composites of several cells can be produced in one injection molding operation together with the coolant seal.

In an embodiment of the manufacturing method, the process time is shortened because it is not the porous plates but a membrane electrode assembly that is coated or partially impregnated or soaked with the first polymeric sealing material in a marginal region.

The coating with polymeric sealing material is preferably carried out by screen printing, particularly preferably by rotary screen printing. The polymeric sealing material can be applied in a very particularly simple manner using stamp printing. The soaking can be carried out in a simple manner by dipping or injection molding.

Suitable materials for the coating or for the composite include FPM (fluorocarbon polymer), EPDM (ethylene propylene diene rubber), silicone, PTFE (polytetrafluoroethylene), epoxy resin or TPE (thermoplastic elastomer).

A very reliable and very durable seal can be produced if the materials for the coating and the composite enter into a chemical combination. This is the case if the same material is used.

BRIEF DESCRIPTION OF THE DRAWINGS

In order to further illustrate the present invention, reference is made to the drawings, the Figures of which schematically show different embodiments according to the present invention. The present invention thus will be explained in greater detail with reference to these schematic drawings, in which.

DETAILED DESCRIPTION OF THE EMBODIMENTS

Figure 1:
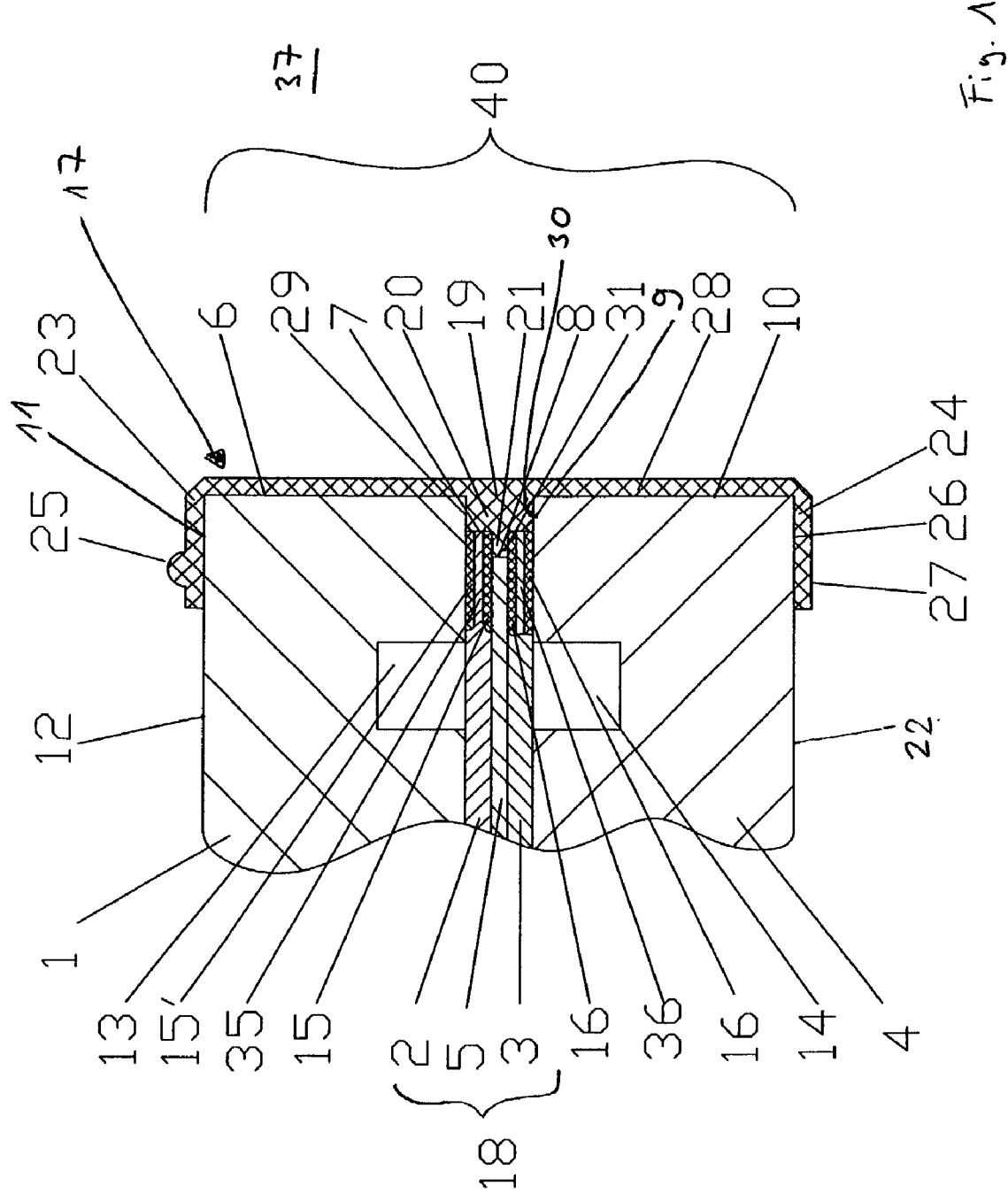
FIG. 1 shows a section through the marginal zone of a fuel cell, including an exemplary embodiment of the sealing arrangement according to the present invention.

FIG. 1 shows a marginal zone of a fuel cell having a sealing arrangement according to a first exemplary embodiment of the present invention. The composite 40 formed of plates is enclosed by peripheral sealing element 17 in the manner of a peripheral sealing band 28. The composite of plates is constituted by two external cell separator plates 1, 4 with a membrane electrode assembly 18 placed therebetween. Membrane electrode assembly 18, in turn, is composed of three further plates, namely, a first porous plate 2, an ion-exchange membrane 5 and a second porous plate 3. Porous plates 2, 3 are permeable to the reaction gases supplied in distribution structure 13, 14. Distribution structure 13, 14 is schematically shown in FIG. 1 as recesses in the surfaces of cell separator plates 1 and 4 facing membrane electrode assembly 18. Peripheral lateral surface 8 of the ion-exchange membrane is set back with respect to peripheral lateral surfaces 7, 9 of porous plates 2, 3. All three peripheral lateral surfaces 7, 8, 9 are set back with respect to peripheral lateral surfaces 6, 10 of cell separator plates 1, 4. In this manner, a sealing gap 19 is formed which devolves in a central region into a second sealing gap 21. According to the present invention, sealing element 17 is designed in such a manner that a peripheral sealing strip 20 extends into the sealing gap. In normal use of the fuel cell, outer cell separator plates 1, 4 are pressed together by end plates and tie bolts, which are not shown in FIG. 1. As a consequence, sealing strip 20 is compressed in sealing gap 19 by pressing surfaces 29, 30. The material of the elastic sealing element itself is gas-impermeable and the contact pressure in the sealing gap prevents the reaction gases from escaping from distribution channels 13 or 14 or from porous plates 2, 3 into surrounding external space 37. Second sealing gap 21, which is formed by the offset arrangement of the peripheral lateral surfaces of membrane electrode assembly 18, is also filled with the elastic material of sealing element 17. This second sealing strip 31 also undergoes a plastic deformation because the contact pressure of the outer cell separator plates is transmitted to porous plates 2, 3, these plates transmitting the contact pressure to second sealing gap 21. In conjunction with impregnated end regions 15 and 16 of porous plates 2 and 3, respectively, the contact pressure in second sealing gap 21 prevents passage of the reaction gases between the anode and the cathode. The deformability of porous plates 2, 3 essentially determines the transmission of the contact pressures into second sealing gap 21. In FIG. 1, the impregnation is indicated by the hatching of areas 15, 16. However, gas diffusion layers of porous plates 2, 3 can also be soaked or coated with a polymeric material at the respective surface facing the cell separator plate. The double-side coating or soaking of end regions 35, 36 improves the sealing performance in the marginal zone. The coating or soaking, which also faces the cell separator plates 1, 4, is indicated in FIG. 1 by hatched areas 15' and 16', respectively.

A very durable and gas-tight composite of the plates of the fuel cell is obtained especially when the elastic sealing material of element 17 adhesively bonds to peripheral lateral surfaces 6, 10 and to pressing surfaces 29, 30 and penetrates in the end regions 35, 36 of porous plates 2, 3. Due to the sealing arrangement, the reactants are not only sealed, but the complex cell structure is held together at the same time. The weight and cost of the energy converter are reduced because additional mechanical clamps are omitted. The sealing element, which is designed in the form of a clamp, can easily be seen in FIG. 1. Elastic sealing element 17 embraces marginal surfaces 11 and 26 of outer cell separator plates 1 and 4. Clamp edge 23 differs from clamp edge 24 by an integrally formed sealing profile 25, whereby, in the case of stacked fuel cells, coolant that is passed over end face 12 of cell separator plate 1 can be sealed in a simple manner. Lower clamp edge 24 passed over second end face 22 has no sealing profile, but is designed as a flat sealing surface 27. The sealing profile 25 of a unit arranged below lies sealingly against this flat sealing surface, which is shown in FIG. 2.

Figure 2:
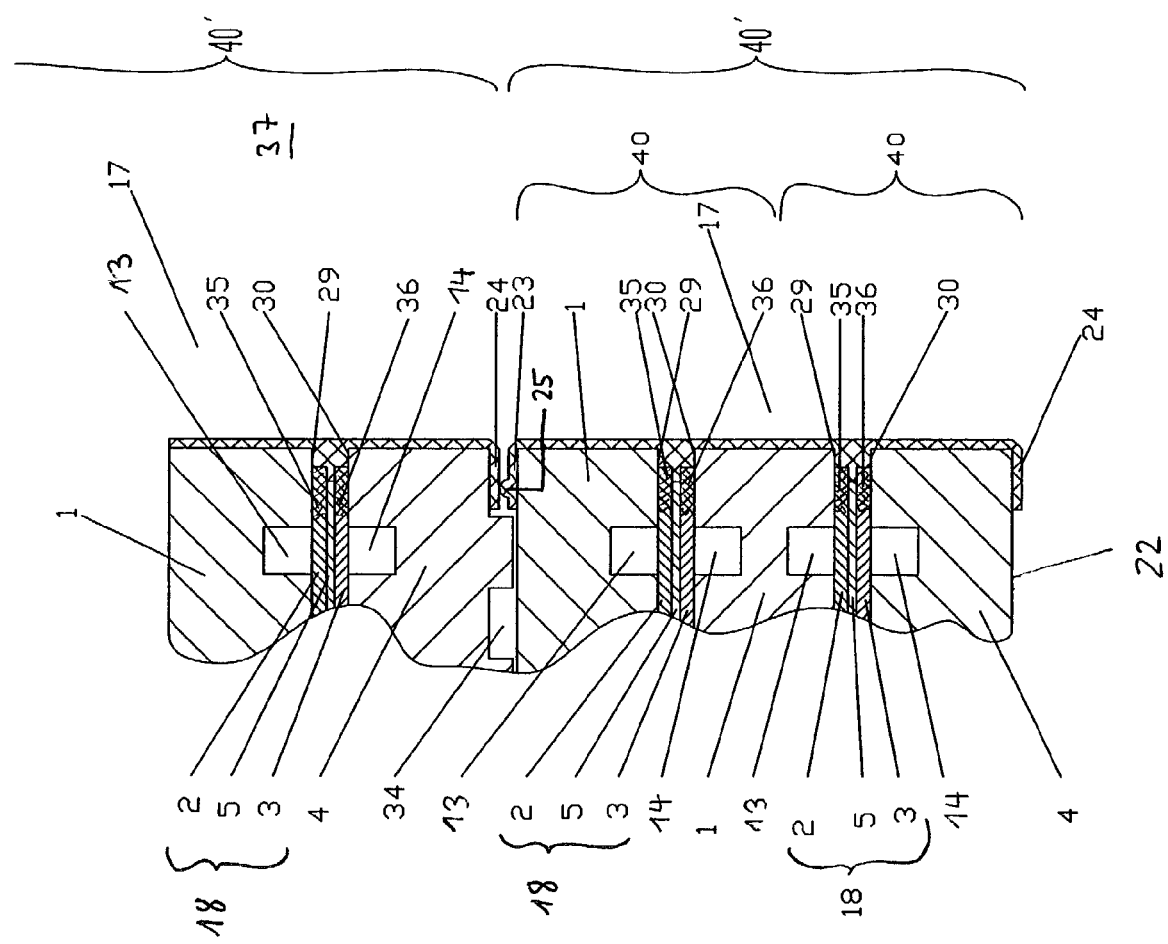
FIG. 2 shows the marginal zone of a plurality of fuel cells arranged in a stack, including a second exemplary embodiment of the sealing arrangement according to the present invention.

FIG. 2 shows a second preferred embodiment of the present invention, in which a plurality of fuel cells are arranged to form a stack. In FIG. 2, the modular design of the energy converter can be appreciated well. Elastic element 17 not only holds together composite 40 of plates of individual fuel cells, but modular composites 40' are formed which are held together by sealing element 17. As already pointed out in the description of FIG. 1, clamp edge 23 has a different design compared to clamp edge 24. Coolant carried in coolant channel 34 is sealed from external space 37 by the contact of clamp edges 24, 23. The configuration and the relative arrangement of the peripheral lateral surfaces of cell separator plates 1, 4, of porous plates 2, 3 and of ion-exchange membrane 8 corresponds to FIG. 1. However, for improved clarity, not all the reference numerals are used in FIG. 2. Marginal regions 35 and 36 of porous plates 2 and 3, respectively, are soaked with a polymeric sealing material, which is also indicated by hatched portions in FIG. 2. The impregnation prevents the reaction gas carried in the pores of plates 2 and 3, respectively, from escaping laterally. In this manner, not only the elastic sealing material in the sealing gap but also end regions 35, 36, which are soaked with polymer, are compressed between the respective pressing surfaces 29 and 30. The effectiveness of the sealing arrangement thus is further improved.

For reasons of clarity, catalyst layers, which are arranged at the surfaces of gas diffusion layers 2 and 3 facing the polymer electrolyte membrane, are neither drawn in FIG. 1 nor in FIG. 2. End plates and tie bolts, which hold together the stack or the fuel cell, are not shown in the Figures either.

The manufacture of a sealing element 17, which compresses composites 40 of fuel cells as shown in FIG. 2, can advantageously be accomplished by injection molding. The present invention allows elastic sealing element 17 to be manufactured and installed in one operation. In this context, membrane electrode assembly 18 is sealed in a gas-tight manner in the sealing gap while at the same time forming a clamp edge 23 or 24 which holds together module 40' and prevents the coolant from escaping into external space 37 using a sealing profile 25. Thus, a simple and inexpensive manufacturing method is available for mass production.

What is claimed is:

1. A sealing arrangement for fuel cells having including at least one composite formed of two cell separator plates with a deformable membrane electrode assembly placed therebetween, the deformable membrane electrode assembly being composed of two porous, gas permeable plates or layers and an ion exchange membrane placed therebetween, the membrane electrode assembly having lateral surfaces set back with respect to lateral surfaces of the cell separator plates to leave a sealing gap, the sealing arrangement comprising:
   an elastic sealing element having a sealing band peripherally enclosing the composite and having a peripheral sealing strip extending into the sealing gap to seal the sealing gap in a gas tight maimer by compression between the cell separator plates wherein the sealing element has a first clamp end extending over a first outer edge of a first end face of a first outer cell separator plate and a second clamp edge extending over a second outer edge of a second end face of a second outer cell separator plate so as to hold together the composite or composites.

2. The sealing arrangement as recited in claim 1 wherein the sealing element has a peripheral sealing profile in the region of the first clamp edge and the second clamp edge has a flat outer surface.

3. A sealing arrangement for fuel cells having including at least one composite formed of two cell separator plates with a deformable membrane electrode assembly placed therebetween, the deformable membrane electrode assembly being composed of two porous, gas permeable plates or layers and an ion exchange membrane placed therebetween, the membrane electrode assembly having lateral surfaces set back with respect to lateral surfaces of the cell separator plates to leave a sealing gap, the sealing arrangement comprising:
   an elastic sealing element having a sealing band peripherally enclosing the composite and having a peripheral sealing strip extending into the sealing gap to seal the sealing gap in a gas tight manner by compression between the cell separator plates wherein the elastic sealing element further includes a second sealing strip, the porous, gas permeable plates each being impregnated and/or coated with a second polymer on one side or on two sides in an end region, a lateral surface of the ion exchange membrane being set back with respect to the lateral surfaces of the porous plates so as to define a second sealing gap, the second sealing strip extending into the second sealing gap to seal the second sealing gap in a gas tight manner by compression between the cell separator plates.

4. A sealing arrangement for fuel cells having including at least one composite formed of two cell separator plates with a deformable membrane electrode assembly placed therebetween, the deformable membrane electrode assembly being composed of two porous, gas-permeable plates or layers and an ion-exchange membrane placed therebetween, the membrane electrode assembly having lateral surfaces set back with respect to lateral surfaces of the cell separator plates to leave a sealing gap, the sealing arrangement comprising:

an elastic sealing element having a sealing band peripherally enclosing the composite and having a peripheral sealing strip extending into the sealing gap to seal the sealing gap in a gas-tight manner by compression between the cell separator plates; a lateral surface of the ion-exchange membrane being set back with respect to the lateral surfaces of the porous plates so as to define a second sealing gap, a second sealing strip extending into the second sealing gap to seal the second sealing gap in a gas-tight manner by compression between the cell separator plates.

5. The sealing arrangement as recited in claim 4 wherein the porous, gas-permeable plates each are impregnated and/or coated with a second polymer on one side or on two sides in an end region.

* * * * *